Patented Dec. 31, 1940

2,226,967

UNITED STATES PATENT OFFICE 2,226,967

PRODUCTION OF STAINLESS STEELS

Edward J. Chelius, Pittsburgh, Pa.

No Drawing. Application August 11, 1939,
Serial No. 289,698

3 Claims. (Cl. 75—127)

This invention is concerned with the production of chromium steels of the stainless types including those containing nickel.

Such steels are usually produced in an electric furnace from a charge including some stainless steel scrap but mainly comprising plain carbon steel that is low in carbon and the impurities. Present day requirements for stainless steels of relatively low carbon contents are met by operating the furnace under oxidizing conditions for a suitable time. Subsequently the alloying constituents are added.

Rolling and fabricating operations result in large quantities of stainless steel scrap and because of its valuable chromium it might seem logical to increase the proportion of this scrap that is charged with the other ferrous material for refinement by oxidation. However, this is not done because chromium under normal furnace conditions oxidizes at a rate that is so much faster than that at which the carbon oxidizes that by the time the carbon is dropped the required amount, there is very little of the chromium from the scrap left in the bath. It follows that the scrap is of little value so far as its chromium content is concerned.

Furthermore, since the stainless steel scrap adds carbon requiring prolongation of the oxidizing period, and also chromium necessitating the abnormal use of ore, scale or the like to provide a proper oxidizing action and, incidentally, requiring a greater furnace heat input to offset the cooling action of these slagging materials, it is necessary to limit the quantity of the stainless steel scrap used in proportion to the plain low carbon steel charge component, to prevent the carbon elimination cost exceeding what value the scrap may afford by its iron and nickel content, assuming it contains the latter element.

The above described limitation placed on the amount of stainless steel scrap that can be used in the production of stainless steel is such that the accumulation of scrap proceeds at a much faster rate than the rate it can be economically returned to the furnaces. During the past several years stainless steel scrap inventories have become annoying to those concerned with the production of stainless steel of the lower carbon contents, increasingly demanded by the trade, yet these inventories still are increasing daily because the prior art provides no remedy.

To determine the extent the chromium in stainless steel scrap provides usable chromium in the metal bath at the end of the oxidizing period under conventional conditions, tests were made during the careful operation of a commercial 60,000 pound electric arc furnace during the running of a number of heats. The pertinent data collected during tests are advanced by the following Table "A," this showing in column 1 the weight of 18—8 scrap charged with plain carbon steel of the usual analysis to make the 60,000 pound charge; column 2, the pounds of ore consumed to reduce the carbon by oxidation from carbon contents of around .15% calculated from the melted charge prior to the oxidation period; column 3, the carbon at the end of the oxidation period; column 4, the chromium in the bath at the end of the oxidation period; and column 5, the chromium recovered in proportion to the chromium calculated as being available in the scrap.

Table A

| Heat No. | Pounds 18–8 scrap charged | Pounds of ore consumed | Percent carbon at end of oxidizing period | Percent chromium end of oxidizing period | Percent chromium recovered |
|---|---|---|---|---|---|
| 1 | 15,000 | 4,000 | .05 | 3.25 | 56.8 |
| 2 | 15,000 | 4,000 | .05 | 1.78 | 32.3 |
| 3 | 15,000 | 4,000 | .07 | 2.90 | 53.8 |
| 4 | 20,000 | 4,000 | .09 | 2.76 | 54.7 |

My invention is the result of my desire to use greater quantities of stainless steel scrap in the production of stainless steels of suitable low carbon content than the prior art permits, by decreasing the amount of chromium lost during the oxidation period and by shortening this period.

To determine my success in lowering the chromium lost I had operated the same furnace for a number of heats in accordance with my invention and by suitable tests obtained the data advanced in the following Table "B," tabulating this data as is done in Table "A."

Table B

| Heat No. | Pounds 18–8 scrap charged | Pounds of ore consumed | Percent carbon at end of oxidizing period | Percent chromium end of oxidizing period | Percent chromium recovered |
|---|---|---|---|---|---|
| 1 | 21,000 | 2,000 | .05 | 5.70 | 76 |
| 2 | 33,200 | 2,000 | .08 | 10.00 | 89.6 |
| 3 | 42,000 | 2,000 | .10 | 11.34 | 84.1 |

These Tables "A" and "B" show that for any particular carbon content at the end of the oxidation period the chromium recovered when the furnace was worked according to my invention was greater than when it was operated according to the prior art. This is particularly noteworthy in view of the much larger amounts of scrap used when my invention was practiced as can be appreciated by comparing columns 1 of the two tables. It may be added that Table "A" shows chromium recoveries representing the maximums obtainable by practicing the prior art and are not representative of normal recoveries effected during economical furnace operation, these being much smaller.

Another fact shown by the tables is that my invention permits large reductions in the amounts of ore or the like used to provide the oxidizing slag. This is important because I discovered that when ore or similar oxide material is used in the refinement of a steel bath containing chromium, the particles of the material quickly become coated with chromite (FeO.Cr$_2$O$_3$) which is a good refractory and prevents the ore particles from dissolving in the slag until the coatings are fused, this increasing the chromium loss by the chromium required to coat the ore particles and prolonging the oxidizing period, thereby affording more opportunity for chromium loss and increasing operating costs.

With the foregoing in mind, my invention, generally speaking, comprises charging relatively larger quantities of stainless scrap containing chromium and carbon with relatively smaller quantities of plain carbon steel in a suitable furnace and when this charge is rendered sufficiently molten by the furnace heating means, increasing its temperature very rapidly to a high temperature considerably in excess of normal furnace temperatures, such as to temperatures of 3000° Fahrenheit and higher for instance, the ore or other oxide for the slag being used much more sparingly than is usual and the oxide required by the oxidizing reactions being obtained by the introduction of free oxygen into the steel bath. Tests have shown that the oxidizing rate of chromium increases relatively slowly as the temperature of the bath increases and that at very high bath temperatures, such as mentioned, the rate of oxidation of carbon is materially increased while that of the chromium is not nearly so materially increased. The result of operating at these high temperatures is a very rapid drop in the carbon in the bath and an appreciable carbon drop without an excessive loss of the chromium through its coating ore particles or the like or otherwise oxidizing into the slag. Reaction is speeded in that a large amount of oxide is formed by direct reaction of the free oxygen so as to avoid the trouble encountered by chromite coating of ore and the like requiring fusing of the coatings on the particles prior to the reaction proceeding.

Oxidation of the chromium is proceeding at an excessive rate during the time required to raise the bath temperature to the point where oxidation of its carbon proceeds at a rate sufficiently rapidly as compared to that at which its chromium oxidizes, to permit elimination of appreciable amounts of its carbon without simultaneously eliminating excessive amounts of its chromium. Therefore, it is imperative that the temperature of the bath be raised sufficiently rapidly to prevent excessive chromium loss. The temperature should be raised from around operating temperatures to around 3000° to 3300° Fahrenheit in not more than 15 minutes. Such a rapid temperature rise cannot be obtained by the usual furnace heating sources, such as the arcs of an electric arc furnace, for instance.

I have found that by introducing oxygen into the bath at a sufficiently rapid rate the temperature of the bath can be raised as rapidly as is necessary to prevent an excessive chromium loss, the heat being provided by reaction of the oxygen and the oxidizable constituents of the bath. I actually inject commercial oxygen as rapidly as it will chemically react with the constituents of the bath and I maintain the furnace heating source, such as the arcs if I am using an arc furnace, in operation during this heating period, all to the end of obtaining the most rapid temperature rise possible. Such a rapid rise is unobtainable by the prior art practices. Preferably, I start the oxygen into the steel bath, at the rapid rate mentioned, as soon as enough of the charge melts to provide a puddle or bath.

It is to be noted that the injected oxygen serves to provide both a source of oxidizing agent and to rapidly raise the bath temperature to the high temperatures I have found necessary.

By the use of oxygen I have been able to obtain very extreme bath temperatures and experiments have shown me that when the bath temperatures begin to exceed around 3300° Fahrenheit, the carbon oxidation rate slows to an impractical speed. Therefore, in practicing my method it is necessary to regulate the amount of oxygen used once the high temperature is obtained and, possibly, to also regulate the usual furnace heating source, to the end of maintaining the bath at temperatures in the range of from 3000° to 3300° Fahrenheit during the oxidizing period.

To illustrate the foregoing, I now advance data collected from tests made during the operation of a 30 pound high frequency electric furnace. These data are tabulated in the following Tables "C" and "D"; columns 1 giving the amounts of carbon in the melted steel baths; columns 2 giving the amounts of chromium in the melted steel baths; columns 3 giving the amounts of oxygen injected into the baths, the rates of injection differing in the two tables; columns 4 giving the total times or durations of the oxidizing periods; and columns 5 giving the bath temperatures.

Table C

| Percent carbon | Percent chromium | Oxygen at 13 liters per minute, total liters | Total time, minutes | Temperature |
|---|---|---|---|---|
| | | | | °F. |
| .10 | 16.88 | | 0 | 3013 |
| .077 | 14.44 | 130 | 10 | 3037 |
| .072 | 12.00 | 260 | 20 | 3118 |
| .044 | 8.48 | 325 | 25 | 3184 |

Table D

| Percent carbon | Percent chromium | Oxygen at 56 liters per minute, total liters | Total time, minutes | Temperature |
|---|---|---|---|---|
| | | | | °F. |
| .10 | 17.18 | 0 | 0 | 2950 |
| .10 | 9.98 | 840 | 15 | 3500 Approx. |

It will be seen from Table "C" that the carbon was dropped from .10% to .044% in only 25 minutes while more than half the chromium was retained in the bath having this reduced carbon content, when oxygen was introduced and the bath temperatures maintained within the temperature range of from 3000° to 3300° Fahrenheit previously discussed. Table "D" shows that when a temperature of 3500° Fahrenheit was used no carbon elimination occurred. As previously mentioned, I find carbon elimination is undesirably slow at temperatures above 3300° Fahrenheit.

Further illustration of what has been discussed is advanced in the form of data collected from tests made during the working of several heats in a 250 pound electric arc furnace. These data are tabulated in the following Table "E"; column 1 giving the amounts of carbon in the melted baths, both initially and finally; column 2 giving the amounts of chromium in the melted baths, both initially and finally; column 3 giving the amounts of chromium remaining in the steel baths at the end of working in proportion to the amounts charged initially in the baths; column 4 giving the times required; column 5 giving the amounts of scrap charged containing 18% chromium; and column 6 giving the working temperatures.

Table E

| Heat No. | Percent carbon | | Percent chromium | | Percent chromium recovered | Time for carbon reduction, minutes | Percent 18% chromium in charge | Temperatures of operation |
|---|---|---|---|---|---|---|---|---|
| | Ini. | Fin. | Ini. | Fin. | | | | °F. |
| 1 | .18 | .11 | 17.74 | 14.63 | 89.3 | 18 | 100 | 3150 |
| 2 | .12 | .04 | 13.26 | 8.57 | 82.5 | 23 | 75 | 3210 |
| 3 | .12 | .07 | 17.12 | 9.36 | 82.7 | 22 | 100 | 3230 |

This Table "E" shows that the use of oxygen to provide the oxide for oxidation and to rapidly raise the bath temperature to the range of from 3000° to 3300° Fahrenheit permits the production of stainless steel having the low carbon contents required, from a charge of 100% stainless steel scrap, with oxidizing periods of well under 30 minutes even when an electric arc furnace is used. This is remarkable because an arc furnace adds carbon to the steel bath through the action of its carbon electrodes so that stainless steel scrap can be refined in such a furnace normally only by the excessive use of ore, scale or other oxides and by prolonged oxidizing periods of a number of hours, even when plain low carbon steel forms a large part of the charge.

As an example of how my invention is being commercially worked, let it be assumed that the furnace is a 60,000 pound electric arc furnace such as was used in obtaining the data in Tables "A" and "B."

This furnace may be charged with almost any desired proportion of stainless steel scrap if my invention is used, so let it be further assumed that over half the charge is such scrap with its usual chromium, carbon and impurities, the balance of the charge being plain low carbon steel scrap of the normal composition.

At this time the arcs may be started so the charge begins to melt at the electrodes. As soon as a molten bath begins to form, just sufficient iron ore, scale or the like, and lime are added to form a protective slag. When the bath has formed sufficiently to be accessible, an oxygen lance is thrust into the bath and commercial oxygen is injected at a rate as rapid as practical.

The bath quickly attains a temperature within the range of from 3000° to 3300° Fahrenheit by this use of oxygen, at which time the furnace arcs are controlled and the rate of oxygen injection controlled so as to prevent exceeding a temperature of 3300° Fahrenheit.

At this stage the bath may be sampled to determine its carbon content, which is rapidly decreasing at an accelerated rate while the chromium resulting from what was in the scrap is decreasing at an abnormally slow rate as compared to what conventionally occurs. Experience will enable the operator to determine the period required to obtain a carbon content sufficiently low so that subsequent additions, after the oxidizing period, will provide the analysis desired, say 18% chromium, .06% carbon and the usual range of impurities allowed in such a steel. At the end of this oxidizing period the slag is removed and replaced by a reducing slag permitting the additions of, for instance, chromium and nickel if the latter is necessary, or other elements which might be required.

This oxidizing period will not require 30 minutes at the most after the charge is melted. Furthermore, more than 75% of the chromium that was in the stainless scrap will be found in the metal bath after the oxidizing slag is removed, for reasons already explained, it being remembered that a greatly excessive quantity, as judged by prior art standards, of stainless steel scrap was charged.

It follows from the foregoing that the use of my invention permits the consumption of stainless steel scrap in furnaces producing stainless steel of the lower carbon contents, at a faster rate than the scrap is produced while resulting in great economy in that the valuable chromium in the scrap is largely put into the steel produced. Therefore, stainless steel scrap inventories can now gradually be reduced and need no longer present a problem in the production of stainless steels of the lower carbon contents increasingly demanded by the trade.

I claim:
1. A method of producing stainless steel, including the steps of charging solid ferrous material containing chromium and carbon into a melting furnace, heating said material in said furnace until it partially melts to form a molten bath and introducing oxygen into said bath to rapidly raise its temperature, the introduction of said oxygen being started before all of said material is melted.

2. A method of producing stainless steel, including the steps of charging solid ferrous material containing chromium and carbon into a melting furnace, heating said material in said furnace until it partially melts to form a molten bath and introducing oxygen into said bath to rapidly raise its temperature, the introduction of said oxygen being started before all of said material is melted and the rate said oxygen is introduced being controlled to maintain the temperature of said bath within a temperature range of from 3000° to 3300° Fahrenheit.

3. A method of using stainless steel scrap in the production of stainless steel, including the steps of charging the scrap in a melting furnace provided with heating means, operating said heating means to render said scrap molten, as soon as an adequate molten bath of said scrap forms introducing oxygen into said bath, said oxygen being introduced into said bath prior to all said scrap melting and while said heating means is operated, and controlling the rate said oxygen is introduced into said bath to maintain it within a temperature range of from 3000° to 3300° Fahrenheit.

EDWARD J. CHELIUS.